(12) United States Patent
Suwa et al.

(10) Patent No.: US 7,684,052 B2
(45) Date of Patent: Mar. 23, 2010

(54) THREE-DIMENSIONAL SHAPE MEASURING APPARATUS, PROGRAM, COMPUTER-READABLE RECORDING MEDIUM, AND THREE-DIMENSIONAL SHAPE MEASURING METHOD

(75) Inventors: Masaki Suwa, Soraku-gun (JP); Yoshiro Ito, Nara (JP); Daisuke Mitsumoto, Nagaokakyo (JP); Masanao Yoshino, Nagaokakyo (JP); Hiroyoshi Koitabashi, Nara (JP); Yoshinobu Asokawa, Nara (JP)

(73) Assignee: OMRON Corporation, Kyoto (JP)

( * ) Notice: Subject to any disclaimer, the term of this patent is extended or adjusted under 35 U.S.C. 154(b) by 579 days.

(21) Appl. No.: 11/584,807

(22) Filed: Oct. 20, 2006

(65) Prior Publication Data
US 2007/0090189 A1    Apr. 26, 2007

(30) Foreign Application Priority Data
Oct. 20, 2005    (JP)    ............................. 2005-306448

(51) Int. Cl.
*G01B 11/24* (2006.01)
(52) U.S. Cl. .................... 356/601; 356/604; 356/605
(58) Field of Classification Search .......... 356/601–610
See application file for complete search history.

(56) References Cited

U.S. PATENT DOCUMENTS 5,646,733 A * 7/1997 Bieman ...................... 356/604

FOREIGN PATENT DOCUMENTS

| GB | 2 078 944 A | 1/1982 |
|---|---|---|
| JP | 2002 286 433 | 10/2002 |
| JP | 2004 117186 | 4/2004 |

OTHER PUBLICATIONS

European Communication with Partial European Search Report dated Mar. 10, 2008 (10 pages).
Yoneyama, S. et al.; "Phase-Measuring Profilometry of Moving Object Without Phase-Shifting Device"; Optics and Lasers in Engineering; vol. 48, No. 3, Sep. 2003; pp. 153-161 (9 pages).
European Communication with European Search Report for Application No. 06122485.3-2213, mailed on Oct. 30, 2009 (5 pages).

* cited by examiner

*Primary Examiner*—Michael P Stafira
(74) *Attorney, Agent, or Firm*—Osha • Liang LLP

(57) ABSTRACT

An apparatus, method, and program for measuring the three-dimensional shape of an object by analyzing an optical pattern projected onto the object includes a line sensor and an image analysis unit. The line sensor reads the target object, onto which the optical pattern is projected. The image analysis unit analyzes the optical pattern in the image read by the line sensor based on a spatial fringe analysis method, and the image analysis unit computes the three-dimensional shape information on the target object. The phase of a pixel included in an image taken of the optical pattern is determined based on the brightness values of the pixel and at least one neighboring pixel in the image; thus the height information of the object can be determined. In addition, the height of the target object at a given position can be computed based on how much the phase of the optical pattern projected onto a certain position of the object is shifted from a reference phase.

18 Claims, 12 Drawing Sheets

Fig. 5A    Top view
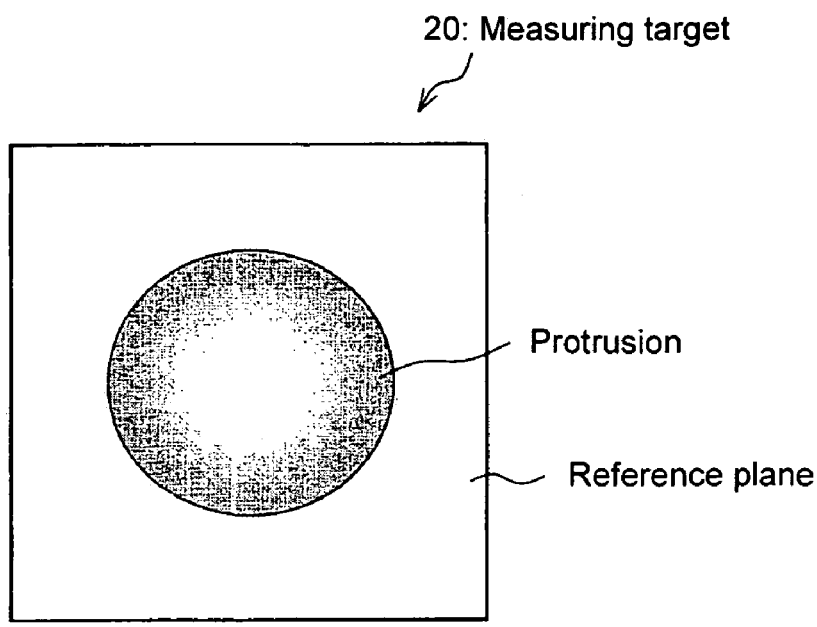
Fig. 5B    Side view
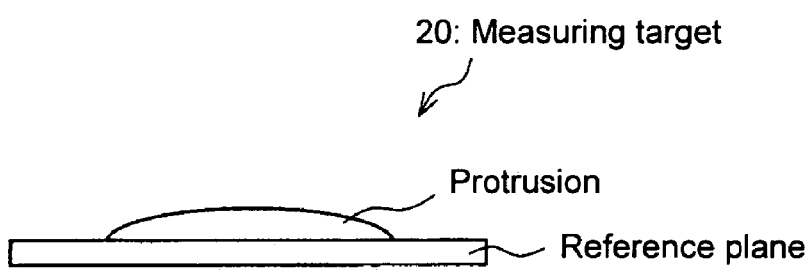

THREE-DIMENSIONAL SHAPE MEASURING APPARATUS, PROGRAM, COMPUTER-READABLE RECORDING MEDIUM, AND THREE-DIMENSIONAL SHAPE MEASURING METHOD

BACKGROUND OF THE RELATED ART

1. Field of the Invention

The present invention relates to a three-dimensional shape measuring apparatus which measures a three-dimensional shape of a target object.

2. Description of the Related Art

An example of means for obtaining three-dimensional shape information on an object by image analysis includes a method of analyzing a deformation amount of the optical pattern changed according to the three-dimensional shape of the target object by projecting an optical pattern onto a target object existing in a predetermined imaging visual field. A light-section method, a spatial encoding method, a fringe analysis method can be cited as a typical example. These methods are based on the principle of triangulation. Among others, for the fringe analysis method, there are proposed many techniques such as spatial fringe analysis and temporal fringe analysis, and the fringe analysis method is known as a technique in which high measurement accuracy is obtained.

In these techniques, usually an area camera is used to read the target object onto which the optical pattern is projected. However, when the area camera is used, because the target object does not fit into one imaging visual field, it is necessary that the area camera be moved in both the lengthwise direction and the crosswise direction to take the one imaging visual field while the one imaging visual field is divided into plural portions, which results in the problem that the imaging time is lengthened.

In order to solve the problem, conventionally there is proposed a three-dimensional shape measuring method in which a line sensor is used instead of the area camera (refer to, for example, Japanese Patent Laid-Open Nos. 2002-286433 and 2004-117186 and Fujigaki, et al., "Parallel optical grating projection method in continuous object shape measurement using plural line sensors" Proceedings on fall semestrial conference of the Japan Society for Precision Engineering pp. 1061-1062, 2004). This measuring method is performed by the following steps. The target object onto which the optical pattern is projected is taken by the line camera, the phase of the projected optical pattern is shifted by moving the target object, the target object onto which the optical pattern having shifted phase is projected is taken by another line camera; the above processes are repeated plural times, and the optical patterns included in the plural taken images are analyzed to measure the three-dimensional shape based on the temporal fringe analysis method (phase shift method).

In a three-dimensional shape measuring apparatus proposed in Japanese Patent Laid-Open No. 2004-117186, the three-dimensional shape is measured by the following method. The target object onto which the optical pattern is projected is taken separately by two line cameras placed at different positions, and the three-dimensional shape is measured from the two taken images based on the stereo method.

SUMMARY

According to several aspects of the invention provide there is provided a three-dimensional shape measuring apparatus which measures the three-dimensional shape of a target object by analyzing an optical pattern projected onto the target object and the brightness of the optical pattern being periodically changed according to a position; the three-dimensional shape measuring apparatus includes a line sensor which reads the optical pattern, projected onto the target object, as an image; and an image analysis unit which computes and/or analyzes the phase of the optical pattern in a pixel included in the image read by the line sensor based on brightness values of the pixel and one or more neighboring pixel(s) in the image, the image analysis unit computing height information on the target object based on the computed phase.

A three-dimensional shape measuring apparatus according to one or more embodiments of the invention computes shape information on the target object by analyzing the optical pattern projected onto the target object. The brightness of the optical pattern is periodically changed according to the position, and the height of the target object at that position can be computed based on how much the phase of the optical pattern projected onto a certain position of the target object is shifted from the phase which becomes a reference.

In several embodiments, the image analysis unit may be implemented in hardware, or the image analysis unit may be implemented by causing a computer to execute a program. A program according to one embodiment of the invention would cause a computer to function as the image analysis unit, the program being recorded in a recording medium.

When these programs are executed by the computer, the computer acts as the image analysis unit.

A three-dimensional shape measuring method according to an embodiment of the present invention includes an optical pattern projection process of projecting an optical pattern onto a target object, brightness of the optical pattern being periodically changed according to a position; an optical pattern reading process of reading the optical pattern as an image with a line sensor, the optical pattern being projected onto the optical pattern through the optical pattern projection process; and an image analysis process of computing a phase of an optical pattern in a pixel included in the image read through the optical pattern reading process, based on brightness values of the pixel and one or more neighboring pixel(s) in the image, the image analysis process computing height information on the target object based on the computed phase.

A three-dimensional shape measuring method according to an embodiment of the present invention includes an optical pattern projection process of projecting an optical pattern onto a target object, brightness of the optical pattern being periodically changed according to a position; an optical pattern reading process of reading the optical pattern as an image with a line sensor, the optical pattern being projected onto the optical pattern through the optical pattern projection process; and an optical pattern analysis process of computing height information on the target object by analyzing an optical pattern in the image read through the optical pattern reading process, based on a spatial fringe analysis method.

BRIEF DESCRIPTION OF THE DRAWINGS

FIG. 5A shows a top view of the shape of an exemplary target object, and FIG. 5B shows a side view of the shape of the target object;

FIG. 12 shows a plan view of an example of a geometric positional relationship between a line sensor and a calibration pattern.

FIG. 14 is an enlarged view showing a main part of FIG. 13;

DETAILED DESCRIPTION

In the conventional techniques, there is difficulty in arranging the line sensor or there is a problem that it takes a long time to take the image.

For example, the temporal fringe analysis method of taking the image of the same portion of the target object plural times from the same angle while changing the phase of the optical pattern projected onto the target object is used as the fringe analysis method in the technique described in Japanese Patent Laid-Open No. 2002-286433. In this case, it is necessary that all the line sensors be strictly arranged in parallel in order to taken the image of the same portion of the target object conveyed in a linear direction. It is also necessary that all the line sensors be arranged at the same distance from a reference plane on which the target object is placed. Additionally, it is necessary that all the line sensors be arranged in the same attitude in order to taken the image from the same angle. For example, four line sensors are used in Japanese Patent Laid-Open No. 2002-286433. However, it is actually difficult for the four line sensors to be arranged as described above.

Thus, arrangement of the line sensor becomes difficult. In addition, because the plural line sensors are required, the problems such as upsizing, price increase, and the increased generation of noise might be generated in the measuring apparatus.

In using the temporal fringe analysis method, there is also a method of taking the image of the target object plural times with one line sensor instead of the plural line sensors. In this case, because parallel processing cannot be performed, the amount of time for taking the images necessary for analysis becomes several times (for example, four times when the four images are taken) compared with the case where the plural line sensors are used. Therefore, the time necessary to the measurement is lengthened.

On the other hand, in methods where the three-dimensional shape is measured by the stereo method from the two images obtained by the two line sensors, and it is necessary to correctly know the geometric arrangement of the two line sensors to measure the three-dimensional shape by the stereo method. Therefore, in this case, it is also necessary that the two line sensors be correctly arranged, which results in the problem that the arrangement of the line sensor becomes difficult. Furthermore, when the stereo method is used, it is difficult to improve the measurement accuracy of the three-dimensional shape to a resolution not more than a pixel of the line sensor. Therefore, the measurement accuracy decreases.

Figure 1:
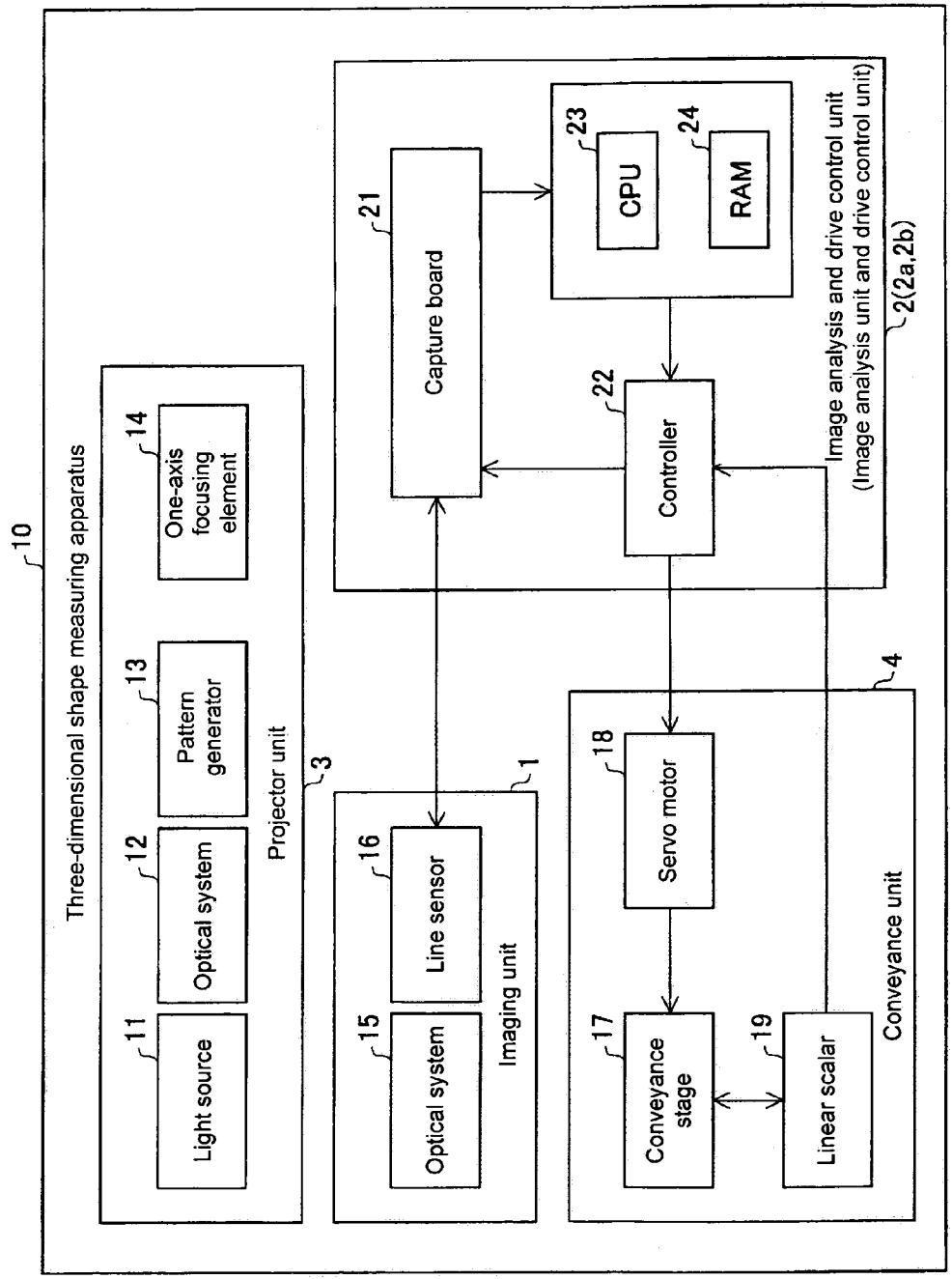
FIG. 1 shows a block diagram of an exemplary configuration of a main part in a three-dimensional shape measuring apparatus according an embodiment of the invention.
Figure 2:
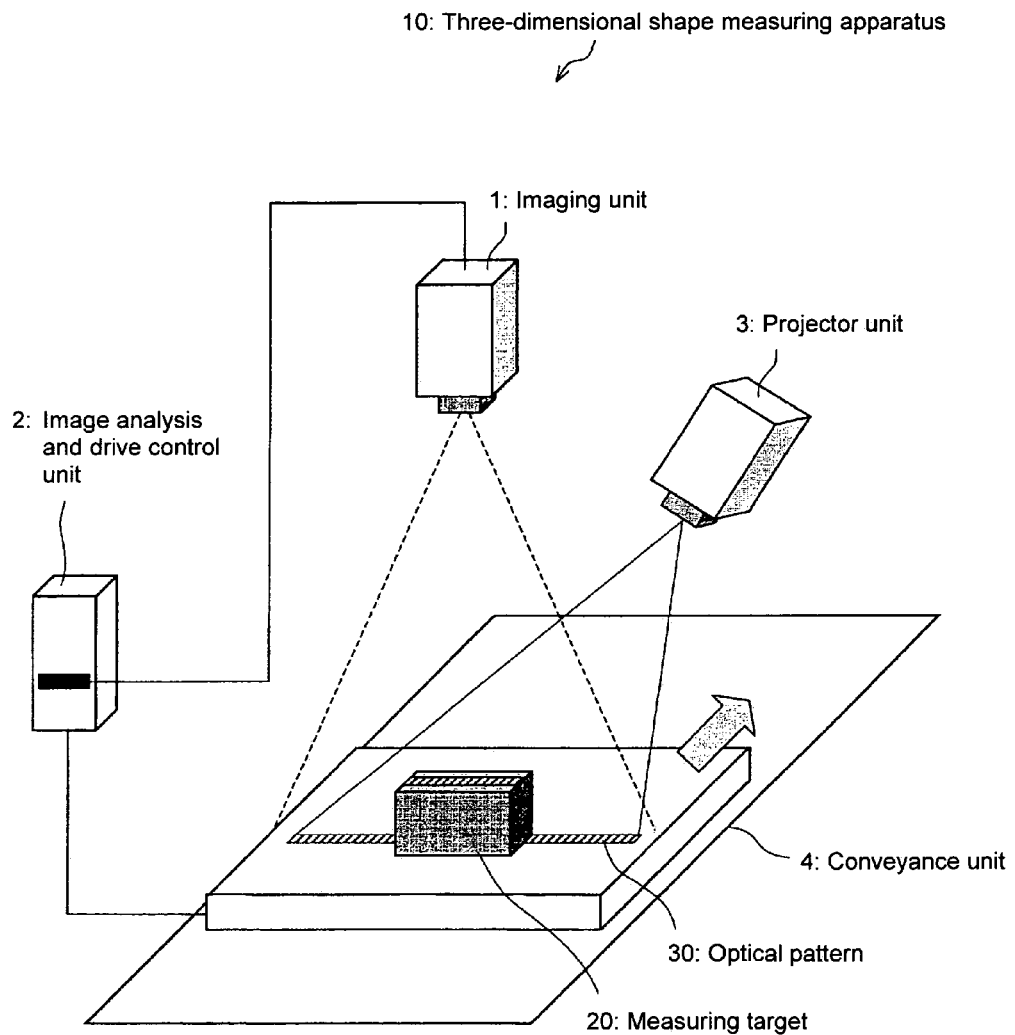
FIG. 2 shows in an embodiment of the invention, a state in which measurement is performed by the three-dimensional shape measuring apparatus.

Embodiments of the invention will be described below with reference to FIGS. 1 to 14. FIG. 2 is a view showing a schematic configuration of a three-dimensional shape measuring apparatus 10 according to an embodiment of the invention. FIG. 1 shows a block diagram of a configuration of a main part in the three-dimensional shape measuring apparatus 10. As shown in FIG. 2, the three-dimensional shape measuring apparatus 10 of the embodiment is an apparatus which measures the three-dimensional shape of a target object 20, e.g., a depth of a recess, a height of a protrusion, and positions of the recess and protrusion provided in a surface of the target object 20 by projecting an optical pattern 30 onto the target object 20 to analyze the shape of the optical pattern 30 projected on the target object 20. The three-dimensional shape measuring apparatus 10 is not particularly limited to a particular use. For example, the three-dimensional shape measuring apparatus 10 can be applied to an apparatus for inspecting a mounting board.

As shown in FIG. 2, the three-dimensional shape measuring apparatus 10 includes an imaging unit 1, an image analysis and drive control unit (image processing unit) 2, a projector unit (optical pattern projection unit) 3, and a conveyance unit 4. The imaging unit 1 is one which reads the target object 20 onto which the optical pattern 30 is projected and obtains the image of the target object 20. As shown in FIG. 1, the imaging unit 1 includes one line sensor 16 and an optical system 15 such as a macro lens.

As shown in FIG. 1, the image analysis and drive control unit 2 is a computer which includes CPU 23 and RAM 24, a capture board 21, and a controller 22. The capture board 21 captures the image in the form of digital data from the imaging unit 1. The controller 22 controls movement of the conveyance unit 4. The image analysis and drive control unit 2 functions as an image analysis unit 2a which analyzes the optical pattern 30, included in the image taken by the imaging unit 1, to compute the three-dimensional shape of the target object 20. The image analysis and drive control unit 2 also functions as a drive control unit 2b which controls the driving of the conveyance unit 4. Obviously the image analysis unit 2a and the drive control unit 2b may be configured by different computers.

Further, in a three-dimensional shape measuring apparatus according to another embodiment of the invention, the image analysis unit includes a setting unit which sets a size of a filter used in the spatial fringe analysis method.

The filter is specifies the attention pixel and the neighboring pixels used in computing the phase of the attention pixel in the spatial fringe analysis method. At this point, when the number of pixels used in computing the phase increases by enlarging the size of the filter, the height is computed based on the larger number of pixels, so that the computation accuracy of the height information is improved. On the other hand, when the number of pixels used in computing the phase decreases by reducing the size of the filter, the number of computation times is decreased, so that the computation speed of the height information is enhanced. The brightness discontinuous point such as the black spot is hardly included, so that the influence of the error propagation caused by the discontinuous point can also be suppressed.

The projector unit 3 projects the optical pattern 30 onto the surface of the target object 20. The projector unit 3 includes a light source 11 such as a halogen lamp or a xenon lamp, a pattern generator 13 which gives the pattern to the light emitted from the light source 11, and an optical system 12 such as a macro lens. Any pattern such as a sine wave, a triangular wave, and a rectangular wave can be used as the projected optical pattern as long as the pattern has the periodicity according to the position and is able to specify the phase.

The sine-wave optical pattern which contributes to the improvement of the measurement resolution is used in this embodiment. A pattern generator implemented with a liquid crystal device, a pattern generator produced by forming glass or film, etc., can be used as the pattern generator 13.

Further, in the three-dimensional shape measuring apparatus according to another embodiment includes an optical pattern projection unit which projects the optical pattern read by the line sensor onto the target object, and the optical pattern projection unit project the optical pattern onto the target object, a pitch of a brightness change of the optical pattern becoming the smallest in a main scan direction of the line sensor.

According to the above configuration, the optical pattern projection unit projects the optical pattern onto the target object such that the pitch of the brightness change becomes the smallest in the main scan direction of the line sensor. Assuming that the direction in which the pitch of the brightness change of the optical pattern becomes the smallest is set at "minimum pitch direction" in the projected optical pattern, in the image taken by the line sensor, the brightness pitch of the optical pattern becomes the smallest by causing the main scan direction of the line sensor and the minimum pitch direction of the optical pattern to coincide with each other. Accordingly, the target object can be measured with high accuracy.

The conveyance unit 4 moves the target object 20 horizontally in a direction (hereinafter referred to as "sub-scan direction") perpendicular to the main scan direction (lengthwise direction) of the line sensor 16. The conveyance unit 4 includes a conveyance stage 17 on which the target object 20 is placed, a servo motor 18 which drives the conveyance stage 17, and a linear scaler 19 which detects the position of the conveyance stage 17. The linear scaler 19 sequentially takes the image while the conveyance unit 4 moves the target object 20 in the sub-scan direction, which enables the three-dimensional shape to be measured in the whole of the target object 20.

In the conventional technique, it is necessary that the minimum pitch direction of the optical pattern be caused to differ from the main scan direction of the line sensor. That is, when the minimum pitch direction of the optical pattern coincides with the main scan direction of the line sensor, the phase of the optical pattern projected onto the same portion of the target object is not shifted even if the target object is conveyed in the direction perpendicular to the main scan direction of the line sensor. As a result, phase difference is not generated between the images taken by the plural line sensors, and the height of the target object cannot be determined.

On the contrary, in the three-dimensional shape measuring apparatus according to this embodiment of the invention, the height of the target object can be computed based on only one image which is obtained by taking the target object onto which the optical pattern is projected with the line sensor. Accordingly, there is generated no problem even if the minimum pitch direction of the optical pattern is caused to coincide with the main scan direction of the line sensor.

A three-dimensional shape measuring apparatus according to another embodiment of the invention includes a line sensor which reads the optical pattern, projected onto the target object, as the image. Thus, the imaging region can be extended in the lengthwise direction (main scan direction) of the line sensor using not the area camera but the line sensor. Therefore, the target object can be imaged with high resolution while the number of times in which the target object is relatively moved in the main scan direction with respect to the line sensor is decreased, which allows the three-dimensional shape information to be rapidly measured with high accuracy.

Although several embodiments are configured to move the target object 20, the imaging unit 1 and the projector unit 4 may be moved in the sub-scan direction instead of the movement of the target object 20. That is, the conveyance unit 4 may move the target object 20 relatively with respect to the imaging unit 1 and the projector unit 4.

An example of a geometric positional relationship among the units included in several embodiments of the three-dimensional shape measuring apparatus 10 will be described below. However, the invention is not limited to the geometric positional relationship described below. For example, in the three-dimensional shape measuring apparatus 10 of this embodiment, an axis in the main scan direction of the line sensor 16 of the imaging unit 1 is arranged in parallel with a plane in which the conveyance stage 17 is placed and perpendicular to the conveyance direction.

The optical axis of the line sensor 16 and the plane in which the conveyance stage 17 is placed are arranged in parallel, which allows the upper surface of the target object 20 to be taken with even magnification. The optical axis of the line sensor 16 and the conveyance direction are perpendicularly arranged, which allows a right-angle portion to be taken as the right-angle portion in the two-dimensional image including the plural line images which are taken while the target object 20 is conveyed.

The optical axis of the projector unit 3 is arranged while having a predetermined angle with respect to the optical axis of the imaging unit 1. Therefore, as described later, the height of the target object 20 can be computed based on the shift of the optical pattern projected onto the target object 20. The geometric arrangement between the imaging unit 1 and the projector unit 3 may previously be measured in the placement, or the geometric arrangement may be computed by a method called calibration.

An operation of a three-dimensional shape measuring apparatus according to one aspect of the invention will be described below. First the servo motor 18 of the conveyance unit 4 sets the conveyance stage 17 at an initial setting position by a command from the image analysis and drive control unit 2. The initial setting position determines an imaging start position in the sub-scan direction when the imaging unit 1 takes the image of the target object 20, and the initial setting position can be the position where the imaging region of the imaging unit 1 is located at an end portion in the sub-scan direction of the target object 20 placed on the conveyance stage 17 of the conveyance unit 4.

The projector unit 3 projects the optical pattern onto the target object 20. The imaging unit 1 scans the target object 20 onto which the optical pattern is projected, and the imaging unit 1 takes the image of the target object 20. The image taken by the imaging unit 1 is transmitted to the image analysis and drive control unit 2, and a capture board 21 of the image analysis and drive control unit 2 converts the image into digital data. CPU 23 of the image analysis and drive control unit 2 analyzes the optical pattern to compute the height information on the target object 20.

In the configuration of the three-dimensional shape measuring apparatus 10 of the embodiment, the spatial fringe analysis method is used in analyzing the optical pattern in the image. This enables the height of the target object 20 to be determined at each position within the scan region (imaging region) of the imaging unit 1 from the one line image which is obtained by a one-time scan of the one line sensor 16 included in the imaging unit 1. The detailed spatial fringe analysis method will be described later.

The image analysis and drive control unit 2 controls the conveyance unit 4 such that the target object 20 is moved by a predetermined distance in the sub-scan direction. Therefore, in the target object 20, the imaging region of the imaging unit 1 and the optical pattern 30 projected by the projector unit 3 are shifted by the predetermined distance in the sub-scan direction. Then, the imaging unit 1 scans the target object 20 to take the line image again. The region of the target object 20, which is shifted from the previous scan region by the predetermined distance in the sub-scan direction, is included in the taken line image.

Similarly the taken image is transmitted to the image analysis and drive control unit 2, and the three-dimensional information is determined at each position within the new scan region.

Thus, the conveyance unit 4 again moves the target object 20 by the predetermined distance, the imaging unit 1 takes the image of the target object 20, and the image analysis and drive control unit 2 analyzes the line image. The three-dimensional shape of the entire target object 20 is measured by repeating the above process.

The length information in the main scan direction of the target object 20 is computed based on the length in the main scan direction of the target object taken in the line image. On the other hand, the length information in the sub-scan direction of the target object 20 is computed based on the conveyance speed by the conveyance unit 4. Thus, the three-dimensional shape information on the target object 20 can be obtained by determining the pieces of length information in the main scan direction and sub-scan direction and the height information of the target object 20.

In this embodiment, the predetermined distance is equal to the length in the sub-scan direction of the imaging region of the imaging unit 1. This enables the whole region of the target object 20 to be measured rapidly through the above process without omission.

Taking the image in each predetermined distance can be implemented by taking the image at predetermined time intervals with the imaging unit 1 while the conveyance stage 17 is moved at a constant speed. In this case, the controller 22 of the image analysis and drive control unit 2 transmits an imaging drive signal to the imaging unit 1 through the capture board 21 at predetermined time intervals of several kilohertz. The drive signal triggers the imaging unit 1 to obtain the image of the target object 20 onto which the optical pattern is projected.

On the other hand, the controller 22 of the image analysis and drive control unit 2 also transmits a conveyance drive signal to the conveyance unit 4 at similar predetermined time intervals. The conveyance drive signal triggers the servo motor 18 of the conveyance unit 4 to drive the conveyance stage 17 at constant speed. Therefore, the image of the target object 20 can be taken in each predetermined region.

The linear scaler 19 may be utilized to take the image at each predetermined distance. In this case, as shown in FIG. 1, the linear scaler 19 is provided in the conveyance unit 1, and the linear scaler 19 transmits the signal to the controller 22 of the image analysis and drive control unit 2 each time the conveyance stage 17 is moved by the predetermined distance. When the controller 22 of the image analysis and drive control unit 2 receives the signal, the controller 22 transmits the imaging drive signal to the line sensor 16 of the imaging unit 1.

Therefore, the image can accurately be taken in each predetermined distance with no influence of the fluctuation in conveyance speed of the conveyance unit 4, which improves the accuracy in the three-dimensional measurement.

The embodiment has the configuration in which the line sensor is used as the reading sensor included in the imaging unit 1. For example, in the case of the use of the line sensor in which the number of pixels in the main scan direction is 7500, the image of the target object whose length in the main scan direction is 100 mm can be taken with a resolution of about 13 μm. On the contrary, if using an area camera in which the number of pixels in the crosswise direction is 640, the image of the target object whose length in the crosswise direction is 100 mm can only be taken with resolution of about 150 μm.

In order to take the image using the area camera with the same resolution as the line sensor, it is necessary that the process in which the area camera is moved by a predetermined distance in the main scan direction to take the image be performed at least 12 times. In this case, it takes a significantly long time to move the imaging unit in the main scan direction.

It is also necessary that the conveyance unit move the conveyance stage 17 both in the main scan direction and in the sub-scan direction, the structure and the control of the drive unit can become complicated, and sometimes there is the problem that the apparatus is enlarged or the trouble frequency (noise) produced within the device increases.

On the other hand, in the three-dimensional shape measuring apparatus of the embodiment, the image of the target object 20 can be taken at high speed with high resolution using the line sensor 16. In the conveyance unit 4, only the conveyance stage 17 is moved in the sub-scan direction, so that the simplification of the apparatus can be achieved.

The embodiment has the configuration in which each line image read by the imaging unit 1 is analyzed by the spatial fringe analysis method. In the spatial fringe analysis method, the phase shift of the optical pattern is computed from the one line image, and the three-dimensional information can be computed from the phase shift.

Therefore, because the total number of scan times necessary to the target object 20 is one, the number of line sensors can become only one. This enables the line sensor to be easily placed compared with the configuration in which the plural line sensors are placed in parallel. The high-speed measurement can be performed compared with the configuration in which the one line sensor is operated plural times.

The height can be measured based on only one line image taken by the one-time scan, so that the three-dimensional shape can also be measured simultaneously with the scan. Therefore, for example in inspecting a printed circuit board (the target object), when some defect in production is found on the board, the measurement can immediately be interrupted without repeating the imaging process to the end, and speed-up can be achieved in the board inspection.

The principle of the image analysis technique of the embodiment will be described.

The image analysis unit 2a analyzes the line image of the target object 20 onto which the optical pattern is projected based on the spatial fringe analysis method. As described above, the spatial fringe analysis method is based on the principle of the triangulation. The principle of the triangulation, the fringe analysis method, and the spatial fringe analysis method, respectively, will be described below.

Figure 3:
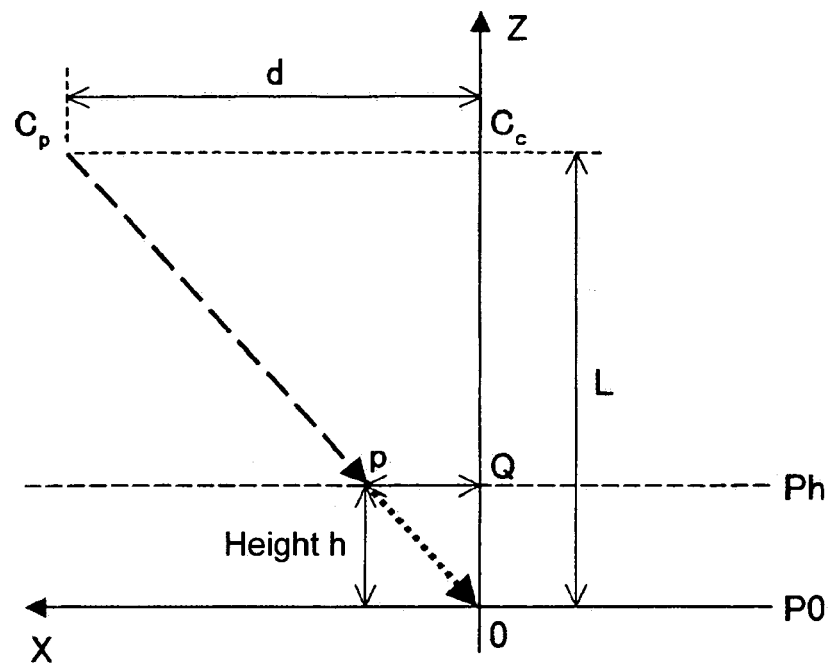
FIG. 3 shows a view for explaining a principle of triangulation.

The principle of the triangulation will first be described. FIG. 3 shows a view for explaining the principle of the triangulation. For the purpose of simple explanation, it is thought that a plane Ph having a height h from a reference plane is observed by an imaging unit Cc having the optical axis perpendicular to the reference plane. It is assumed that a projector unit Cp is arranged at the same height as the imaging unit Cc when viewed from the reference plane and the projector unit Cp projects the optical pattern toward a position of a point O on the reference plane P0.

In the case where the plane Ph which is parallel to the reference plane and separated way from the reference plane by the height h is observed, the optical pattern going to the point O intersect a point P. When viewed from the imaging unit Cc, the optical pattern projected toward the reference plane P0 is observed at the position which is shifted by a distance PQ from the position O (namely, position P) where the optical pattern should normally be observed. The position shift PQ is called phase difference.

When the phase difference can be computed, the height h can be computed by the following formula (1).

[Formula 1]

$$h = \frac{L}{d} \cdot PQ \quad (1)$$

Where PQ is a distance between the points P and Q, namely, PQ indicates the phase difference. The distance d is the distance between the optical axis centers of the imaging unit Cc and the projector unit Cp, L is the distance from the imaging unit Cc to the reference plane, with d and L being known values.

Figure 4:
FIG. 4 shows an embodiment of the invention, an example of an optical pattern projected by a projector unit.

Then, the fringe analysis method will be described. In the embodiment, a sine-wave optical pattern is used as the optical pattern projected onto the target object 20. The sine-wave optical pattern shall mean a pattern in which the brightness has graduation expressed by a sine function. In other words, the sine-wave optical pattern means the optical pattern in which the relationship between the position and the brightness is expressed by the sine function. FIG. 4 shows an example of the sine-wave optical pattern.

Figure 6:
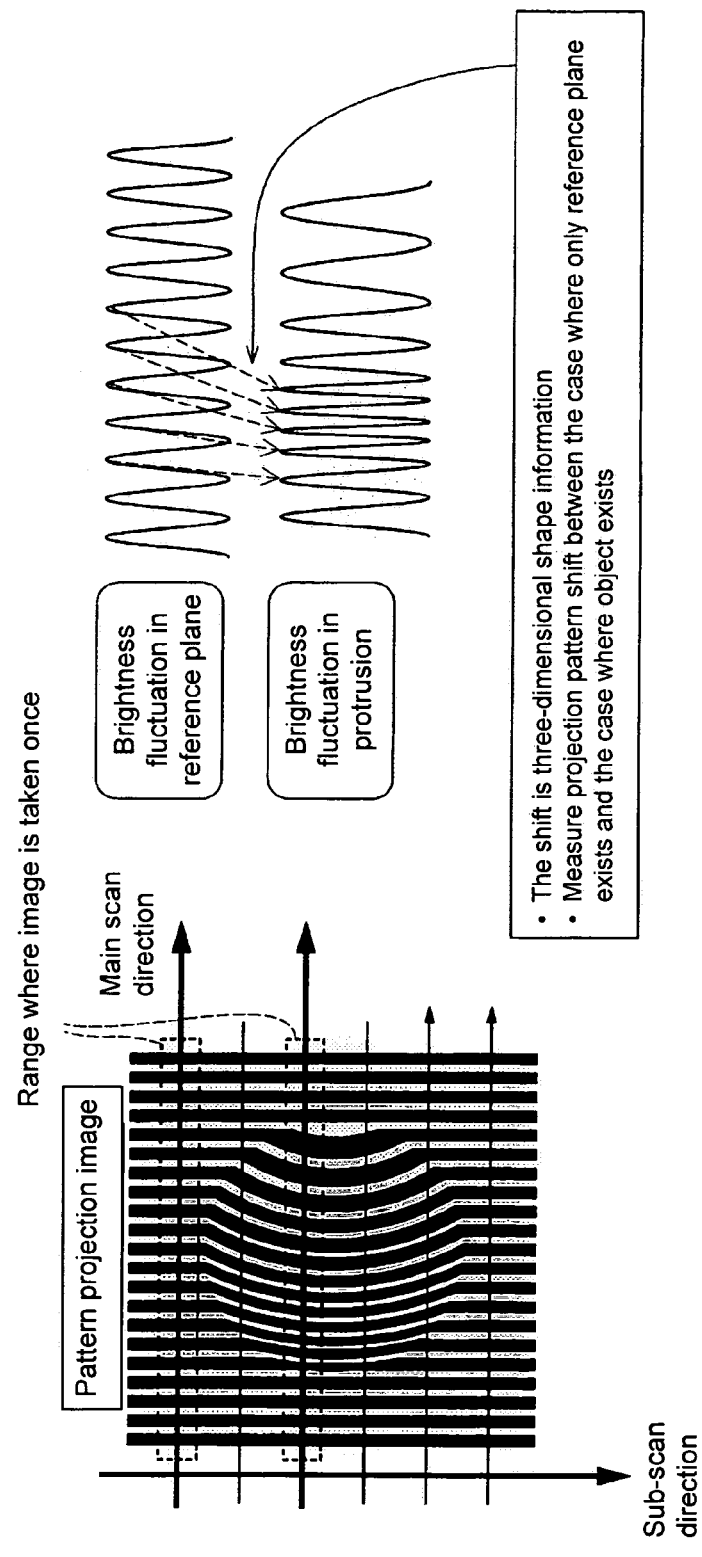
FIG. 6 shows distortion of the optical pattern projected onto the target object when the optical pattern of FIG. 4 is projected onto the target object of FIG. 5.

In the case where the optical pattern is projected onto the target object 20 shown in FIGS. 5A and 5B, the projected optical pattern becomes the left side of FIG. 6 when observed from above. That is, in the optical pattern projected from the oblique direction, distortion is generated in a protrusion having the height.

When the line sensor 16 of the imaging unit 1 scans the target object 20 onto which the optical pattern is projected in the above-described manner, the relationship between the scan position and the brightness becomes the right side of FIG. 6.

As shown on the right side of FIG. 6, the brightness is always changed in a constant period in the optical pattern projected onto the reference plane where the protrusion does not exist. On the other hand, the bright period is changed by a slope of the protrusion in the optical pattern projected onto the protrusion, which results in the phase shift with respect to the optical pattern projected onto the reference plane.

Therefore, when the difference between the phase of the optical pattern in the pixel at a certain position included in the image (line image) in which the optical pattern is actually projected onto the target object 20 to take the image and the phase (reference phase) of the same pixel in which the optical pattern is projected onto the reference plane is determined, the height of the target object 20 can be determined at the position corresponding to the pixel based on the principle of the triangulation.

In computing the phase difference, a reference phase can previously be determined by projecting the optical pattern onto the reference plane to take the image. On the other hand, there are roughly two methods of determining the phase of the optical pattern in the pixel at each position included in the image (line image) in which the optical pattern is actually projected onto the target object 20 to take the image. The spatial fringe analysis method differs from the temporal fringe analysis method in the method of determining the phase.

As shown in the right side of FIG. 6, in the sine function, the same phase which gives a certain displacement exists at two points in one period. For example, in the function expressed by y=sin θ, the phase θ which gives the displacement y=0 exists at two points of 0 and π. The phase θ which gives the displacement y=½ exists at two points of π/6 and 5π/6. For this reason, in the taken image, the phase of the optical pattern in the image cannot be determined from the brightness value (corresponding to the displacement of the sine function) of a single pixel.

On the other hand, in spatial fringe analysis, on the basis of the brightness values of the pixel whose phase is determined (hereinafter referred to as "attention pixel") and the neighboring pixel(s), the phase in the attention pixel is computed. For example, in the above example, the phase θ which gives the displacement y=0 exists at two points of 0 and π. However, in the attention pixel, the phase of 0 differs from the phase of π in the brightness value of the neighboring pixel(s). For example, when the phase is 0 in the attention pixel, the brightness value of the neighboring pixel(s) whose phase is slightly smaller than that of the attention pixel becomes smaller than the brightness value of the attention pixel.

On the other hand, when the phase is π in the attention pixel, the brightness value of the neighboring pixel(s) whose phase is slightly smaller than that of the attention pixel becomes larger than the brightness value of the attention pixel. Accordingly, the one phase can be determined as the phase of the optical pattern based on the neighboring pixel(s) of the attention pixel. Thus, spatial fringe analysis is characterized in that the phase in the attention pixel is determined based on the brightness value of the pixel(s) existing near the attention pixel. So, above "the brightness of the neighboring pixel(s) is different" can also be expressed as, "the brightness gradient of the neighboring pixel(s) is different".

The specific process of the spatial fringe analysis method used in the three-dimensional shape measuring apparatus of this and several embodiments will be described below. However, the invention is not limited to the process described below, but any applicable process may be adopted.

In the embodiment, a phase-shift optical pattern in which the phase is shifted by 90° from the optical pattern is virtually produced from the taken line image. At this point, when the projected optical pattern is set by formula (2), the phase-shift optical pattern in which the phase is shifted by 90° from the optical pattern is expressed by formula (3).

[Formula 2]

$$I(x) = B(x)\sin(\phi(x)) \quad (2)$$

Where I(x) indicates a brightness value at a position x, β (x) indicates an arbitrary function, and φ(x) indicates a phase at the position x.

[Formula 3]

$$\hat{I}(x) = B(x)\sin\left(\phi(x) + \frac{\pi}{2}\right) \quad (3)$$
$$= B(x)\cos(\phi(x))$$

Where I(x) indicates a brightness value at the position x by the phase-shift pattern.

Accordingly, the phase φ(x) of the pixel at the position x can be determined by the following formula (4).

[Formula 4]

$$\phi(x) = \tan^{-1}\frac{I(x)}{\hat{I}(x)} \quad (4)$$

Where the value of I(x) is the brightness value of the pixel at the position x in the main scan direction. On the other hand, the value of Î(x) (hereinafter I(x) with a hat is conveniently described as Î(x)) is computed using Hilbert conversion. That is, the brightness value Î(x) at the position x by the phase-shift optical pattern is expressed by the following formula (5).

[Formula 5]

$$\hat{I}(x) = \frac{1}{\pi}\int_{-\infty}^{\infty}\frac{I(\tau)}{x-\tau}d\tau \quad (5)$$

At this point, the obtainable brightness data is data in each pixel; namely, the brightness data is the discrete data, so that the formula (5) is approximated in the form of the following formula (6).

[Formula 6]

$$\hat{I}(x) = \sum_{k=-N}^{N} h(x-k)I(k) \quad (6)$$

Where h(x) is a function expressed by h(x)=1/(πx), and h(x) indicates temporal region characteristic of the Hilbert conversion. The value of the Î(x) can be determined by the formula (6).

Figure 7:
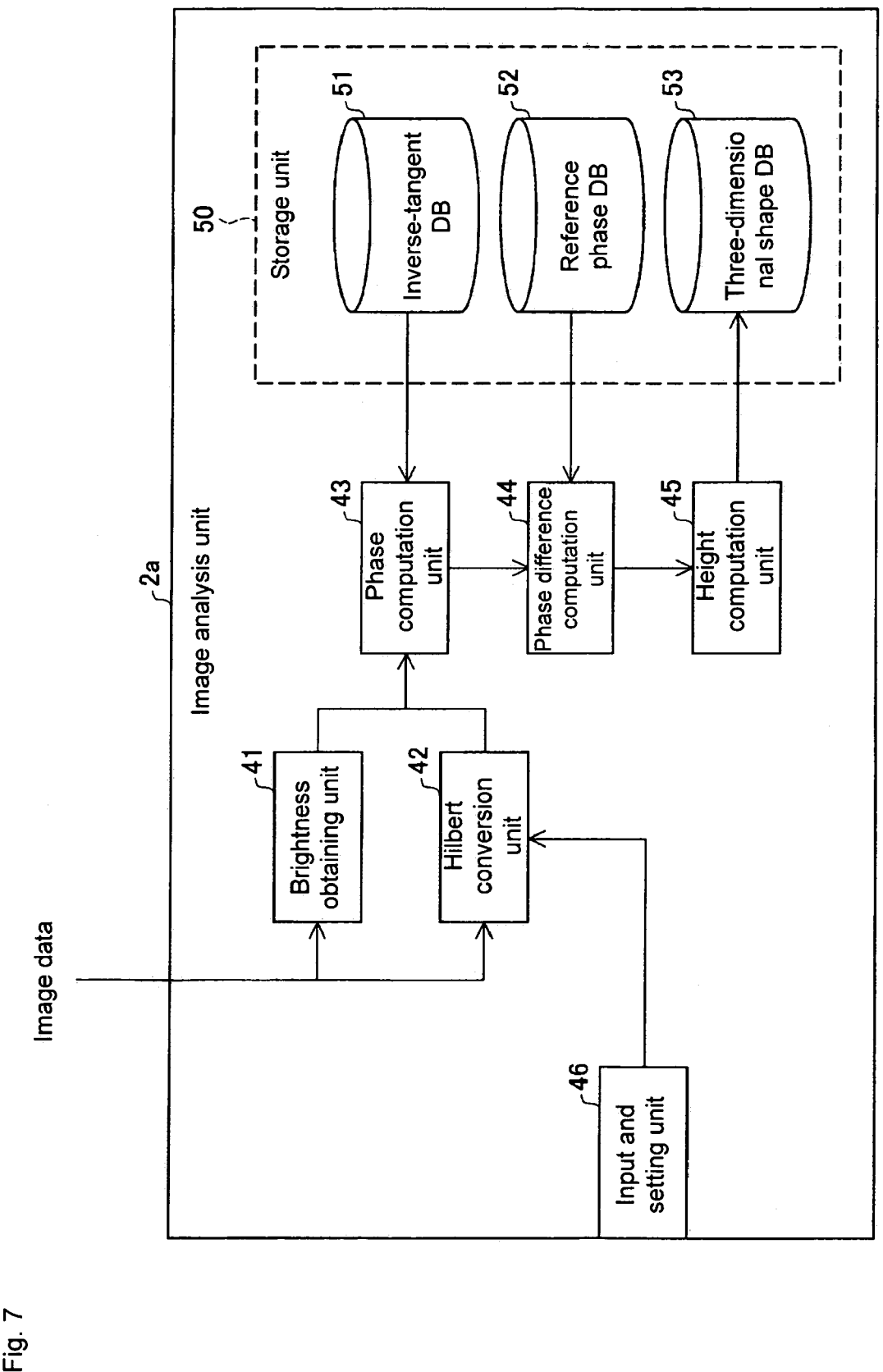
FIG. 7 shows a functional block diagram of the image analysis unit shown in FIG. 1.

A configuration of the image analysis unit 2a will be described below. FIG. 7 shows a functional block diagram of the image analysis unit shown 2a. The image analysis unit 2a includes a brightness obtaining unit 41, a Hilbert conversion unit 42, a phase computation unit 43, a phase difference computation unit 44, and a height computation unit 45. These units implemented by causing CPU (Central Processing Unit)

23 to execute various control programs. Alternatively, these units can be implemented by a DSP (Digital Signal Processor) (not shown).

The image analysis unit 2a includes a storage unit 50, and the storage unit 50 can be implemented by any one of RAM 24, ROM, and external storage device or a combination thereof. An inverse tangent DB 51, a reference phase DB 52, and a three-dimensional shape DB 53 exist in the storage unit 50.

The inverse tangent DB 51 is a database which indicates correspondence between y and x in the function expressed by y=tan$^{-1}$x. The value of x and the value of tan$^{-1}$x are appropriately correlated and stored in the inverse tangent DB 51 so that the value of y of the inverse tangent can be searched based on the value of x.

The reference phase DB 52 is a database in which the phase (hereinafter referred to as "reference phase") of the optical pattern in each pixel of the line image of the reference plane (plane always having the height of 0) onto which the optical pattern is projected is previously stored. The position x in the main scan direction of the pixel included in the line image and the reference phase $\phi_0$(x) in the pixel are appropriately correlated and stored in the reference phase DB 52 so that the reference phase $\phi_0$(x) in the pixel can be searched based on the position x of the pixel included in the line image.

The three-dimensional shape DB 53 is a database in which the three-dimensional shape information of the target object 20 obtained by the measurement is stored. An x-coordinate (corresponding to the main scan direction), a y-coordinate (corresponding to the sub-scan direction), and a z-coordinate (corresponding to the height) which specify a point on the surface of the target object 20 are appropriately correlated and stored in the three-dimensional shape DB 53 so that, after the measurement, the height (z coordinate) at the position can be searched based on the x-coordinate and the y-coordinate of the target object 20.

Then, image analysis process of the image analysis unit 2a will be described. The line image which is taken by the imaging unit 1 having the line sensor 16 and transmitted to the image analysis unit 2a becomes an image in which the pixels are continuously arranged in the main scan direction of the line sensor 16. In the line image in which the pixels are linearly arranged, the image processing unit 2a sequentially computes the height from one of end portions toward the other end portion (terminal end). Therefore, the position x of the pixel in the main scan direction is set at zero (Step S1).

Then, the brightness obtaining unit 41 obtains the brightness value I(x) of the pixel at the position x from the line image data (Step S2). The obtained brightness value is transmitted to the phase computation unit 43. Then, the Hilbert conversion unit 42 computes the brightness value Î(x) of the pixel at the position x by the phase-shift optical pattern from the line image data based on the formula (6) (Step S3). The computed brightness value is transmitted to the phase computation unit 43.

The phase computation unit 43 uses the phase-shift of the optical pattern to determine the brightness value I(x) and the brightness value Î(x) of the pixel at the position x, and the phase computation unit 43 computes the phase of the optical pattern at the position x from these two values based on the formula (4) (Step S4). Alternatively, the phase computation unit 43 divides I(x) by Î(x), and the phase computation unit 43 may determine the inverse tangent of the result by referring to the inverse tangent DB 51. The computed phase is transmitted to the phase difference computation unit 44.

The phase difference computation unit 44 which receives the phase of the optical pattern at the position x obtains the reference phase of the optical pattern at the position x by referring to the reference phase DB 52, and the phase difference computation unit 44 computes the phase difference (phase shift) Δφ(x) at the position x by subtracting the reference phase from the phase received from the phase computation unit 43 (Step S5). The computed phase difference is transmitted to the height computation unit 45.

The height computation unit 45 which receives the phase difference computes the height z of the target object 20 at the position x based on the principle of the triangulation (Step S6). Specifically, the height z is computed as the distance from the reference plane, and the height z can be determined by the following formula (7).

[Formula 7]

$$z = f(\Delta\phi(x)) = \frac{\Delta\phi(x)}{A(x,z)\Delta\phi(x) + B(x,z)} \quad (7)$$

In the formula (7), A(x,z) and B(x,z) are functions, that for each pixel, are determined depending on the geometric arrangement such as the pattern period, the distance from the camera to the reference plane, and the pattern projection angle. However, because these functions are a function of an unknown number z, it is difficult to compute the strict forms of these functions. Accordingly, plural targets whose distances ($z_0, z_1, \ldots, z_K$) are already known are observed to compute values of $\{A(x,z_0),B(x,z_0)\}, \{A(x,z_1),B(x,z_1)\}, \ldots, \{A(x,z_K),B(x,z_K)\}$ in each pixel, and function z can be estimated with computed values by line approximation or spline function approximation.

The height computation unit 45 stores the height z computed in the above-described manner in the three-dimensional shape DB 53 while the height z is correlated with the coordinate x in the main scan direction and the coordinate y in the sub-scan direction (Step S7).

It is then determined whether or not the position x is the terminal end of the linear line image (Step S8). When the position x is the terminal end of the line image, the image analysis process is ended. On the other hand, when the position x is not the terminal end of the line image, the value of x is incremented by one to shift the position of the attention pixel by one pixel in the main scan direction (Step S9). Processing then returns to Step S2.

When the processes from Step S2 to Step S9 are repeated, the height information at each position along the main scan direction of the target object 20 is stored in the three-dimensional shape DB 53. When the image analysis process is ended, the conveyance unit 4 shifts the target object 20 in the sub-scan direction, the imaging unit 1 takes the image of the target object 20, and the image analysis process is performed based on the taken line image again. Therefore, the pieces of height information at the positions along the sub-scan direction are sequentially stored in the three-dimensional shape DB 53, and finally the three-dimensional shape information of the whole of target object 20 is stored in the three-dimensional shape DB 53.

In determining the brightness value of the phase-shift optical pattern at the position x based on the formula (6) in Step S3, the value of the parameter N in the formula (6) can be variable. This means that the number of neighboring pixels of the attention pixel can also be variable. The neighboring pixel is used to compute the brightness of the phase-shift optical pattern at the position x. In other words, the size of the filter used in the spatial fringe analysis method can be variable.

In this case, for example, an input and setting unit (setting unit) 46 can further be provided in the image analysis unit 2a as shown in FIG. 7. The input and setting unit (setting unit) 46 has both an input function of inputting the value of the parameter N in the formula (6) and a setting function of setting the inputted value of the parameter N in the Hilbert conversion unit 42. Therefore, the Hilbert conversion unit 42 computes the brightness value Î(x) of the phase-shift optical pattern based on the value of the parameter N inputted by, for example, a user (namely, the number of neighboring pixels used for the computation).

At this point, when the value of N is increased (namely, when the filter size is enlarged), the phase is computed based on the larger number of pixels, so that the computation accuracy is improved in the finally determined height information.

On the other hand, when the value of N is decreased (namely, when the filter size is reduced), the number of operations necessary to compute Î(x) is decreases, so that the computation speed is enhanced. The brightness discontinuous point such as a black spot is hardly included in the neighboring pixel(s) of the attention pixel, so that the influence of the error propagation caused by the discontinuous point can also be avoided.

Additionally, pre-processing can be performed on the line image taken by the imaging unit 1 before the line image is transmitted to the brightness obtaining unit 41 and the Hilbert conversion unit 42. Examples of the pre-process include removal of a noise included in the line image and the normalization of the line image.

In the normalization of the line image, a reference line image is obtained separately. For the reference line image, the image of the target object 20 is taken when the target object 20 is irradiated with the light having an even brightness and while the optical pattern is not projected. The line image can be normalized with the reference line image by correcting the line image which is taken while the optical pattern is projected.

Specifically, the brightness value of each pixel in the line image taken with the optical pattern projected can be divided by the brightness value of the corresponding pixel of the reference line image. The image normalization can reduce the computed phase error caused by the difference in reflective characteristic of the regions in the target object 20.

In the case where the line image is normalized, the scan may be performed twice: in the state in which the imaging unit 1 projects the optical pattern and in the state in which the imaging unit 1 does not project the optical pattern, or a second imaging unit similar to the imaging unit 1 may further be provided to obtain the reference line image.

Figure 9:
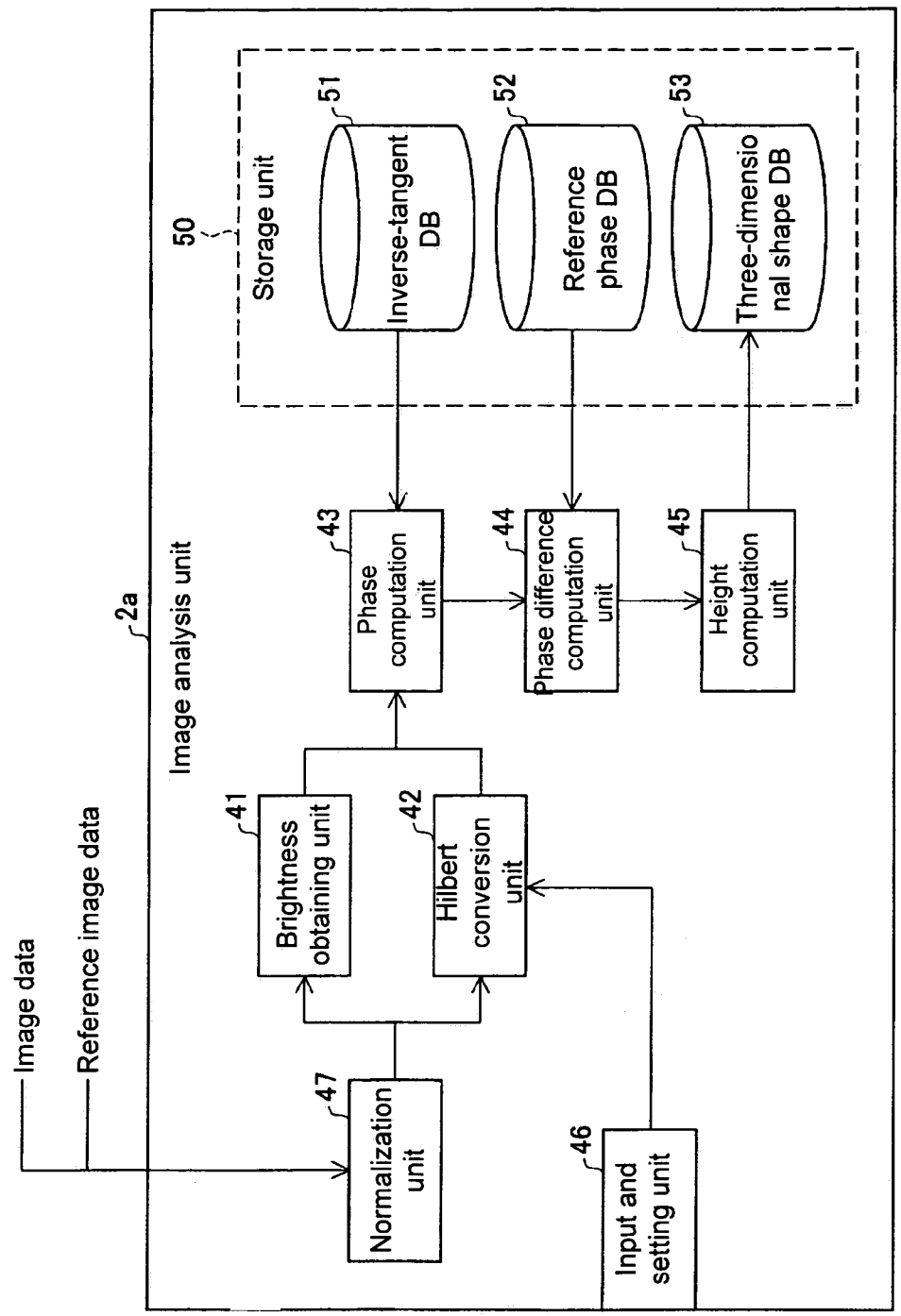
FIG. 9 shows a functional block diagram of the image analysis unit shown in FIG. 1.

As shown in FIG. 9, a normalization unit 47 which receives both the line image in the state where the optical pattern is projected and the reference line image can also be provided in the image analysis unit 2a to perform the above process. The image normalized by the normalization unit 47 is transmitted to the brightness obtaining unit 41 and the Hilbert conversion unit 42, and the brightness obtaining unit 41 and the Hilbert conversion unit 42 compute the height information based on the normalized line image.

In the case where the scan is performed twice in the state in which the imaging unit 1 projects the optical pattern and in the state in which the imaging unit 1 does not project the optical pattern, that the pattern generator 13 included in the projector unit 3 can be implemented using a liquid crystal device. Therefore, the optical pattern can easily be turned on and off.

Alternatively, the pattern generator 13 having the region where the pattern is formed and the region where the pattern is not formed is produced on the surface of glass or film, and the presence or absence of the pattern may be switched by shifting the glass or film.

After the phase computation unit 43 computes the phase, the phase computation unit 43 may perform the post-process to the computed phase. For example, a PLL (Phase Locked Loop) unit is further provided between the phase computation unit 43 and the phase difference computation unit 44 to reduce the error caused by the noise.

Figure 8:
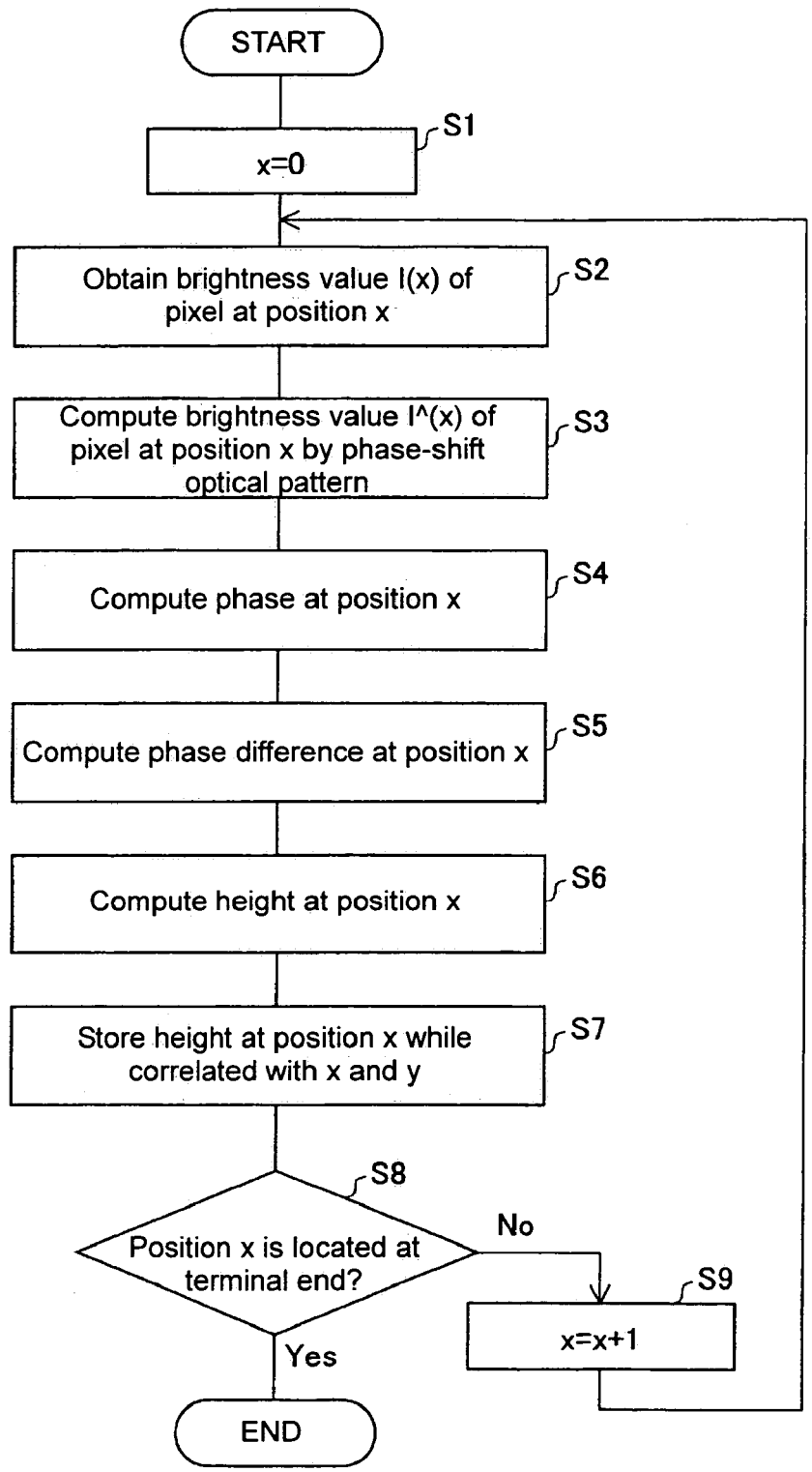
FIG. 8 shows a flowchart of processes performed by the image analysis unit shown in FIG. 1.

The pre-process can be performed before Step S2 shown in FIG. 8, and the post-process can be performed between Steps S5 and S6 shown in FIG. 8. Thus, the image analysis unit 2a can measure the three-dimensional shape of the target object 20 based on the line image taken by the imaging unit 1.

The measurement accuracy is improved as the pitch is decreased. When the brightness pitch of the optical pattern becomes the smallest in the line image taken by the line sensor 16, the minimum pitch direction of the optical pattern coincides with the main scan direction of the line sensor 16.

Accordingly, in the three-dimensional shape measuring apparatus 10 of the embodiment, the minimum pitch direction of the optical pattern projected onto the target object 20 is parallel to (coincides with) the main scan direction of the line sensor 16.

In the conventional apparatus, because plural line sensors are used to take the optical pattern, it is necessary that the optical pattern be projected onto the imaging region of each of the plural line sensors. At this point, in the case where the dedicated projection unit is individually provided in each of the plural line sensors, there is generated the problem that the projected optical pattern fluctuates in each projection unit. For this reason, generally the one projection unit is provided. When using one projector unit, it is necessary to project an optical pattern that can cover all the imaging regions of the plural line sensors.

However, the three-dimensional shape measuring apparatus 10 of the embodiment has the configuration in which the image of the target object 20 is taken with the single line sensor 16, so that the optical pattern projected by the projector unit 3 covers only the imaging region of the single line sensor 16. Therefore, in the three-dimensional shape measuring apparatus 10 of the embodiment, it is not necessary that the projected optical pattern spreads in the two-dimensional direction as shown in FIG. 4.

Figure 10:
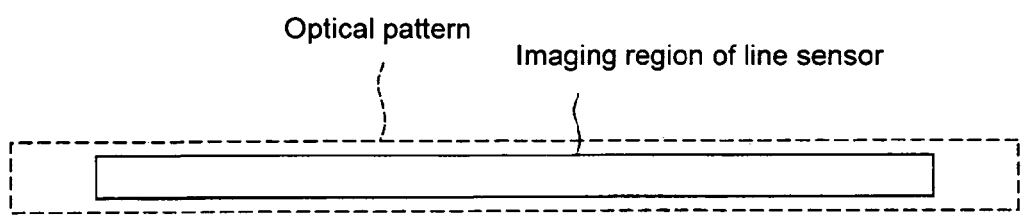
FIG. 10 shows an example of the optical pattern projected by the projector unit according to another embodiment of the invention.

At this point, in order to enhance the energy efficiency of the optical pattern, the projector unit 3 projects the focused optical pattern. Specifically, as shown in FIG. 10, the projector unit 3 can project a linear shaped optical pattern focused on the (one) axis extending in the main scan direction of the line sensor 16 (the optical pattern has a micro finite width in the sub-scan direction) onto the target object 20.

In this case, as shown in FIG. 1, the projector unit 3 includes a one-axis focusing element 14 which focuses the optical pattern on the one axis, and the one-axis focusing element 14 can focus the optical pattern in the linear shape extending in the main scan direction. The linear shape optical pattern is projected to cover the imaging region of the line sensor 16.

A Fresnel lens and a cylindrical lens can be cited as an example of the one-axis focusing element 14. When the lens (es) are arranged between the pattern generator 13 and the target object 20, the optical pattern focused on the one axis can be projected onto the target object 20.

An example of a technique of measuring a gradient with respect to the conveyance direction of the imaging unit 1 to adjust the geometric positional relationship between the imaging unit 1 and the conveyance unit 4 will be described below.

In measuring the positional relationship between the imaging unit 1 and the conveyance unit 4 in the conveyance direction, the target object on which the calibration pattern is formed is conveyed by the conveyance unit 4, the line sensor 16 of the imaging unit 1 sequentially takes the images of the target object, and the image analysis and drive control unit 2 analyzes the taken image including the plural line images. In this case, the image used in the analysis is a two-dimensional image which includes the entire target object on which the calibration pattern is formed and spreads in both the main scan direction and the sub-scan direction.

Figure 11:
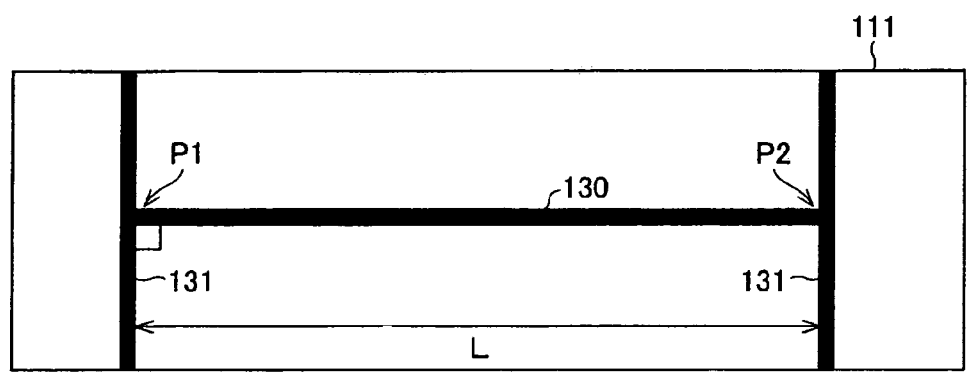
FIG. 11 shows an example of a calibration pattern projected onto the target object according to an embodiment of the invention.

The calibration pattern has various patterns that are cast on the target object to calibrate the line sensor. FIG. 11 shows a calibration pattern 111 of the embodiment. As shown in FIG. 11, in the calibration pattern 111, one horizontal line 130 and two vertical lines 131 and 131 orthogonal to the horizontal line 130 are formed by the laser beam of a printer, and the distance L between the vertical lines 131 and 131 is already known.

The calibration pattern 111 shows and example minimum configuration. In other embodiments, calibration pattern can consist of plural calibration patterns 111 shown in FIG. 11 which can be arranged vertically and horizontally.

In the embodiment, how much the line sensor 16 and the calibration pattern 111 are inclined is measured based on the conveyance stage moving direction (conveyance direction, sub-scan direction) of the conveyance unit 4.

Figure 12A:
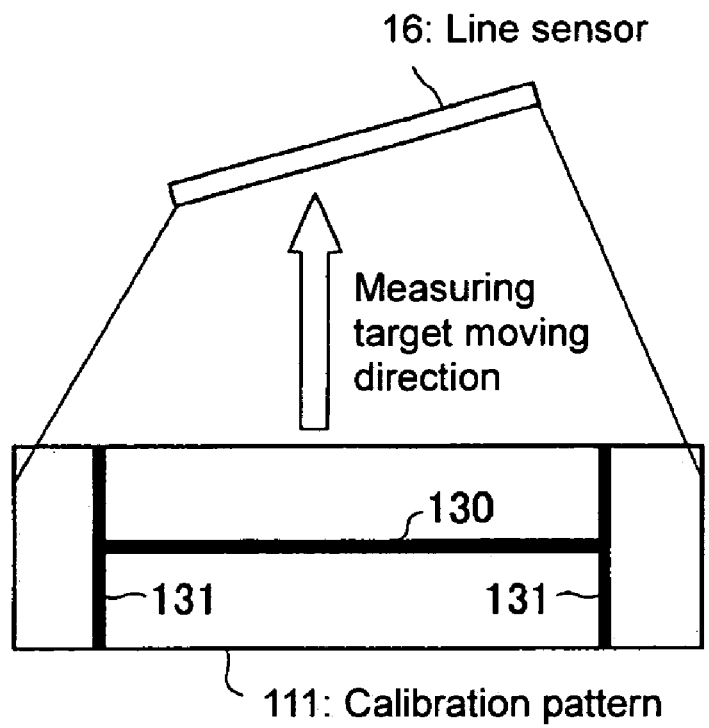
FIG. 12A shows a state in which the line sensor in inclined with respect to a sub-scan direction.

FIG. 12A shows an example of the geometric positional relationship between the line sensor 16 and the calibration pattern 111. In the example shown in FIG. 12A, while the main scan direction of the line sensor 16 is inclined with respect to the perpendicular to the sub-scan direction (conveyance direction), the horizontal line 130 of the calibration pattern 111 is perpendicular to the sub-scan direction, and the vertical line 131 is parallel to the sub-scan direction.

In this case, the position where the image sensor of the line sensor 16 receives the light from the vertical line 131 does not change even if the target object is moved. Accordingly, the vertical line 131 remains a vertical line in an image taken of calibration pattern 111.

On the other hand, the line sensor 16 does not receive the light from the horizontal line 130 all at once, that is, the line sensor 16 receives the light from one end to the other end sequentially (from the left end to the right end in FIG. 12A) as the target object is moved. Therefore, the horizontal line 130 appears inclined in an image taken of calibration pattern 111.

Accordingly, the inclination of the line sensor 16 can be adjusted when the inclination angle of the horizontal line 130 is determined from an image of the calibration pattern 111.

Figure 12B:
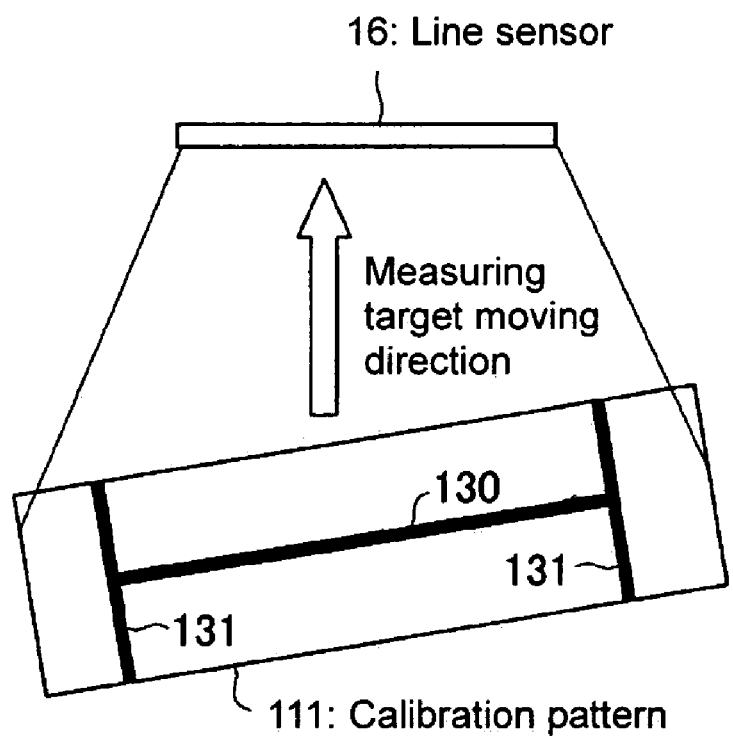
FIG. 12B shows a state in which the calibration pattern is inclined with respect to the sub-scan direction.

FIG. 12B shows another example of the geometric positional relationship between the line sensor 16 and the calibration pattern 111. In the example shown in FIG. 12B, the horizontal line 130 of the calibration pattern 111 is inclined perpendicular to the sub-scan direction while the main scan direction of the line sensor 16 is perpendicular to the sub-scan direction, and the vertical line 131 is inclined parallel to the sub-scan direction.

In this case, the position where the image sensor of the line sensor 16 receives the light from the vertical line 131 is changed in a certain direction (rightward in FIG. 12B) as the target object is moved. Accordingly, the vertical line 131 appears inclined in an image taken of the calibration pattern 111.

On the other hand, the line sensor 16 does not receive the light from the horizontal line 130 all at once, but the line sensor 16 receives the light from one end to the other end sequentially (from the right end to the left end in FIG. 12B) as the target object is moved. Therefore, the horizontal line 130 appears inclined in an image taken of the calibration pattern 111.

Accordingly, the image of the calibration pattern 111 becomes the image in which both the lengthwise direction and the crosswise direction are inclined. However, because the line sensor 16 is not inclined, if one of inclination angles of the vertical line 131 and horizontal line 130 can be determined from the image of the calibration pattern 111, the other inclination angle can be obtained, which allows the inclination of the target object to be adjusted.

Figure 13:
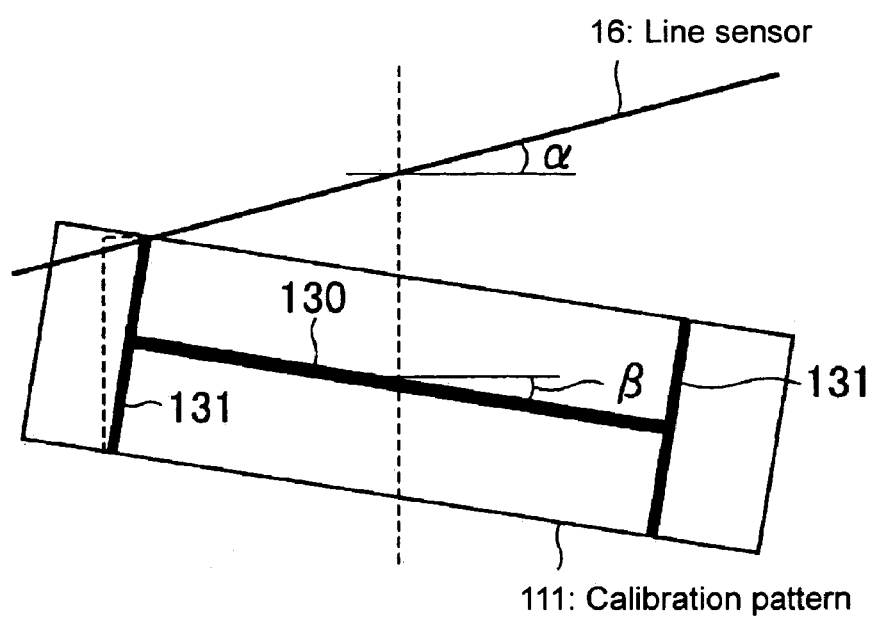
FIG. 13 shows a plan view of another example of the geometric positional relationship between the line sensor and the calibration pattern wherein both the line sensor and the calibration pattern are inclined with respect to the sub-scan direction.

FIG. 13 shows the positional relationship when the cases shown in FIGS. 12A and 12B are further generalized. That is, FIG. 13 shows the case in which both the line sensor 16 and the calibration pattern 111 are inclined with respect to the sub-scan direction (conveyance direction), and FIG. 13 shows the positional relationship when the calibration pattern 111 and the line sensor 16 are viewed from above.

In FIG. 13, α indicates an angle in which the calibration pattern 111 is inclined counterclockwise from the direction perpendicular to the sub-scan direction with respect to the line sensor 16 (hereinafter referred to as "inclination"). Beta (β) indicates an angle in which the horizontal line 130 of the calibration pattern 111 is inclined clockwise from the direction perpendicular to the sub-scan direction, i.e., the vertical line 131 of the calibration pattern 111 is inclined clockwise from the sub-scan direction (hereinafter referred to as "skew angle").

Figure 14A:
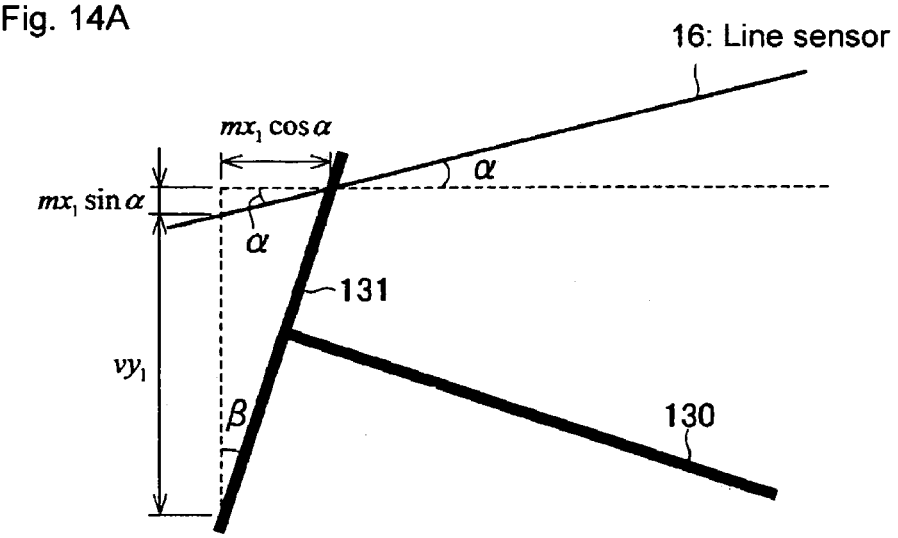
FIG. 14A shows the positional relationship of a vertical line of the calibration pattern and the line sensor.
Figure 14B:
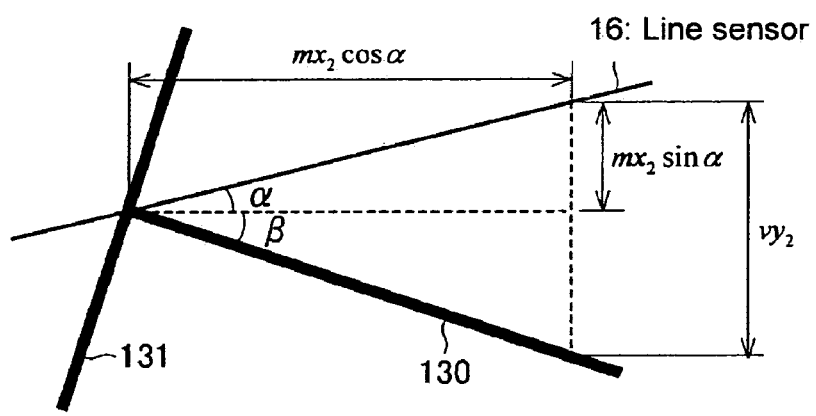
FIGS. 14B and 14C shows the positional relationship of a horizontal line of the calibration pattern and the line sensor and a positional relationship of a distance between the vertical lines and the line sensor.
Figure 14C:
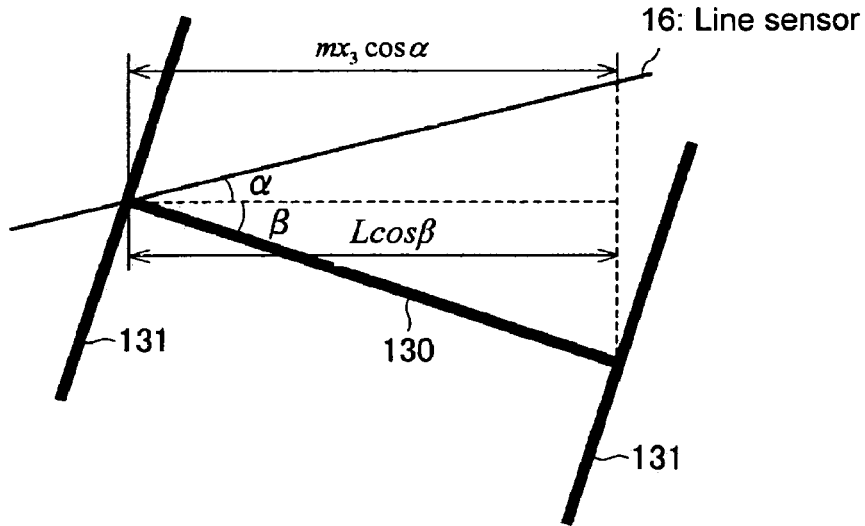

FIG. 14 shows an enlarged view of the main part of FIG. 13. FIG. 14A shows the positional relationship between the vertical line 131 of the calibration pattern 111 and the line sensor 16 when the line sensor 16 reads the vertical line 131. FIG. 14B shows the positional relationship between the horizontal line 130 of the calibration pattern 111 and the line sensor 16 when the line sensor 16 starts to read the horizontal line 130. FIG. 14C shows the relationship of the distance between the vertical lines 131 and the line sensor 16.

In the image of the calibration pattern 111, the vertical line 131 becomes an oblique line, and the vertical line 131 has the length in the crosswise direction (hereinafter referred to as "x-component") and the length in the lengthwise direction (hereinafter referred to as "y-component") in the image. In the vertical line 131 on the image, the x-component is set at x1 and the y-component is set at y1.

At this point, as shown in FIG. 14A, the relationship between the x-component x1 and the y-component y1 in the vertical line 131 on the image is expressed by the following formula (8):

$$\tan(\pi/2-\beta)=(v\times y1+m\times x1\times\sin\alpha)/(m\times x1\times\cos\alpha)=(v\times k1)/(m\times\cos\alpha)+\tan\alpha \quad (8)$$

Where v is moving speed (scalar) of the line sensor 16, and m is a conversion magnification indicating a size ratio in the image and the actual object. k1 is k1=y1/x1, i.e., the inclination of the vertical line 131 on the image.

Similarly, in the image of the calibration pattern 111, the horizontal line 130 becomes the oblique line, and the horizontal line 130 has the x-component and the y-component on the image. In the horizontal line 130 on the image, the x-component is set at x2 and the y-component is set at y2. At this point, as shown in FIG. 14B, the relationship between the x-component x1 and the y-component y2 in the horizontal line 130 on the image is expressed by the following formula (9):

$$\tan\beta=(v\times y2-m\times x2\times\sin\alpha)/(m\times x2\times\cos\alpha)=(v\times k2)/(m\times\cos\alpha)-\tan\alpha \quad (9)$$

Where k2 is k2=y2/x2, i.e., the inclination of the horizontal line 130 on the image.

As shown in FIG. 14C, the relationship between the distance L of the actual vertical line 131 and an x-component x3 in the distance of the vertical line 131 on the image is expressed by the following formula (10)

$$L\times\cos\beta=m\times x3\times\cos\alpha \quad (10)$$

The conversion magnification m, the inclination α of the line sensor 16, and the skew angle β of the target object can be determined with the following formulas (11) to (13) by solving the formulas (8) to (10):

$$m=(L^2/x3^2-k1\times k2\times v^2)^{1/2} \quad (11)$$

$$\sin\alpha=v\times(k2-k1)/(L^2/x3^2-k1\times k2\times v^2)^{1/2} \quad (12)$$

$$\sin\beta=x3\times v\times(k1+k2)/(2\times L) \quad (13)$$

In a modification of the three-dimensional shape measuring apparatus 10 of the embodiment, the imaging unit 1 may include the plural line sensors 16. The brightness noise of the line sensor can statistically be removed by including the plural line sensors, and the stability of the three-dimensional shape measurement can be improved. Alternatively, the image of the same portion in the target object 20 may be taken plural times to remove the noise.

The imaging unit 1 and the projector unit 3 may be configured to move in the main scan direction when the one line sensor cannot cover the main scan direction of the target object 20. Alternatively, the imaging unit 1 and the projector unit 3 may be configured to be moved in the main scan direction.

Each functional block of the image analysis unit 2a, specifically the brightness obtaining unit 41, the Hilbert conversion unit 42, the phase computation unit 43, the phase difference computation unit 44, and the height computation unit 45 can be implemented by hardware logic. Alternatively the functional blocks may be implemented by software executed on a CPU.

That is, the image analysis unit 2a includes a CPU (central processing unit) which executes the control program command for realizing each function, ROM (read only memory) in which the program is stored, RAM (random access memory) which expands the program, and a storage device (recording medium) such as a memory in which the program and various kinds of data are stored.

In one embodiment, the above-described configurations are implemented by supplying a recording medium, in which program codes (executable format program, intermediate code program, and source program) of the control program of the image analysis unit 2a are recorded while being readable by the computer, to the image analysis unit 2a to cause the computer (or CPU or MPU) to read and execute the program code recorded in the recording medium. The control program of the image analysis unit 2a is the software for realizing the above functions.

Examples of the usable recording medium include a tape system such as magnetic tape and cassette tape, a disc system including magnetic discs such as a floppy disk (registered trademark) and a hard disk and optical discs such as CD-ROM, MO, MD, and DVD/CD-R, a card system such as an IC card (including a memory card) and an optical card, and a semiconductor memory system such as mask ROM, EPROM, EEPROM, and flash ROM.

The image analysis unit 2a may be connected to a communication network to supply the program code through the communication network. There is no particular limitation to the communication network. For example, the Internet, an intranet, an extranet, LAN, ISDN, VAN, a CATV communication network, a virtual private network, a public telephone line, a mobile communication network, and satellite communication network can be utilized.

There is no particular limitation to the transmission medium constituting the communication network. For example, wired transmission mediums such as IEEE 1394, USB, a power-line carrier, a cable TV line, a telephone line, and an ADSL line or wireless transmission mediums including infrared ray such as IrDA and a remote-controller, Bluetooth (registered trademark), 802.11 wireless, HDR, a portable telephone network, a satellite line, a digital terrestrial network can be utilized. Several embodiments of the invention can also be implemented in a mode of the computer data signal embedded in a carrier wave, in which the program code is realized in the electronic transmission.

The invention is not limited to the above embodiments, but various changes could be made without departing from claims of the invention. That is, the technical range of the invention shall include modifications and changes obtained by the combination of technical means appropriately changed within the range shown in claims.

In addition, by use of any of the several embodiments of the invention, the three-dimensional shape of the target object can be measured, and thus these embodiments can be included in, for example, an apparatus for inspecting the mounting board.

What is claimed is:

1. A three-dimensional shape measuring apparatus comprising:
   a line sensor that reads an optical pattern projected onto a target object, wherein brightness of the optical pattern is periodically changed according to position and wherein the line sensor reads the optical pattern as an image; and
   an image analysis unit that computes a phase of the optical pattern in a pixel included in the image read by the line sensor based on brightness values of the pixel and at least one neighboring pixel in the image, wherein the image analysis unit computes height information on the target object based on the computed phase; and
   an optical pattern projection unit that projects the optical pattern onto the target object,
   wherein the optical pattern projection unit projects the optical pattern onto the target object such that a pitch of a brightness change of the optical pattern becomes smallest in a main scan direction of the line sensor.

2. A three-dimensional shape measuring apparatus according to claim 1, wherein the image analysis unit comprises a setting unit that sets a number of neighboring pixels used in computing the phase of the optical pattern.

3. A three-dimensional shape measuring apparatus comprising:
   a line sensor that reads an optical pattern projected onto a target object, wherein brightness of the optical pattern is periodically changed according to position and wherein the line sensor reads the optical pattern as an image;
   an image analysis unit that:
   analyzes a phase of the optical pattern in the image read by the line sensor based on a spatial fringe analysis method, and
   computes height information on the target object; and
   an optical pattern projection unit that projects the optical pattern onto the target object,
   wherein the optical pattern projection unit projects the optical pattern onto the target object such that a pitch of a brightness change of the optical pattern becomes smallest in a main scan direction of the line sensor.

4. A three-dimensional shape measuring apparatus according to claim 3, wherein the image analysis unit comprises a setting unit that sets a size of a filter used in the spatial fringe analysis method.

5. A three-dimensional shape measuring apparatus according to claim 1, wherein the optical pattern projection unit projects the optical pattern onto the target object such that the optical pattern has a linear shape in which the optical pattern is focused on one axis extending in the main scan direction of the line sensor.

6. A three-dimensional shape measuring apparatus according to claim 1, wherein the line sensor reads the target objects in two states comprising a state where the optical pattern is projected and a state where the optical pattern is not projected,
   wherein the image analysis unit normalizes brightness of the image read by the line sensor in the state where the optical pattern is projected onto the target object based on brightness of the image read by the line sensor in the state where the optical pattern is not projected onto the target object, and
   wherein the image analysis unit analyzes the optical pattern in the image of the normalized brightness.

7. A three-dimensional shape measuring apparatus according to claim 1, further comprising two line sensors comprising a first line sensor and a second line sensor,
   wherein the first line sensor reads the target object onto which the optical pattern is projected,
   wherein the second line sensor reads the target object onto which the optical pattern is not projected,
   wherein the image analysis unit normalizes brightness of the image read by the first line sensor based on brightness of the image read by the second line sensor, and
   the image analysis unit analyzes the optical pattern in the image of the normalized brightness.

8. A three-dimensional shape measuring apparatus according to claim 1, further comprising a conveyance unit that conveys at least one of the line sensor and the target object at a predetermined conveyance speed in a sub-scan direction orthogonal to a main scan direction of the line sensor,
   wherein the line sensor reads the optical pattern projected onto the target object while moved in the sub-scan direction with respect to the target object,
   wherein the image analysis unit computes length information on the main scan direction of the target object based on a number of pixels in the main scan direction in the image, and
   wherein the image analysis unit computes length information on the sub-scan direction of the target object based on the conveyance speed.

9. A three-dimensional shape measuring method comprising:
   projecting an optical pattern onto a target object;
   reading the optical pattern as an image;
   computing a phase of the optical pattern in a pixel included in the image read by a line sensor based on brightness values of the pixel and at least one neighboring pixel in the image, and
   computing height information on the target object based on the computed phase, wherein the optical pattern is projected onto the target object such that a pitch of a brightness change of the optical pattern becomes smallest in a main scan direction of the line sensor.

10. A program stored on computer-readable recording medium for causing a computer to function as an image analysis unit of a three-dimensional shape measuring apparatus including a line sensor that reads an optical pattern projected onto a target object, the program for causing the computer to perform:
- computing a phase of the optical pattern in a pixel included in the image read by the line sensor based on brightness values of the pixel and at least one neighboring pixel in the image, and
- computing height information on the target object based on the computed phase,
- wherein the optical pattern is projected onto the target object such that a pitch of a brightness change of the optical pattern becomes smallest in a main scan direction of the line sensor.

11. A three-dimensional shape measuring method comprising:
- an optical pattern projection process of projecting an optical pattern onto a target object, wherein brightness of the optical pattern is periodically changed according to position;
- an optical pattern reading process of reading the optical pattern as an image;
- an image analysis process of
- computing a phase of the optical pattern in a pixel included in the image read through the optical pattern reading process based on brightness values of the pixel and at least one neighboring pixel in the image, and
- computing height information on the target object based on the computed phase,
- wherein the optical pattern is projected onto the target object such that a pitch of a brightness change of the optical pattern becomes smallest in a main scan direction of the line sensor.

12. A three-dimensional shape measuring method according to claim 11, wherein the image analysis process includes a setting process of setting a number of neighboring pixels used in computing the phase of the optical pattern.

13. A three-dimensional shape measuring method comprising:
- an optical pattern projection process of projecting an optical pattern onto a target object, wherein brightness of the optical pattern periodically changed according to position;
- an optical pattern reading process of reading the optical pattern as an image; and
- an optical pattern analysis process of computing height information on the target object by analyzing an optical pattern in the image read through the optical pattern reading process based on a spatial fringe analysis method
- wherein the optical pattern is projected onto the target object such that a pitch of a brightness change of the optical pattern becomes smallest in a main scan direction of the line sensor.

14. A three-dimensional shape measuring method according to claim 13, wherein the image analysis process includes a setting process of setting a size of a filter used in the spatial fringe analysis method.

15. A three-dimensional shape measuring method according to claim 11, wherein, in the optical pattern projection process, a pitch of a brightness change becomes smallest in a main scan direction of the optical pattern reading process.

16. A three-dimensional shape measuring method according to claim 11, wherein, in the optical pattern projection process, the optical pattern projected onto the target object has a linear shape in which the optical pattern is focused on one axis extending in the main scan direction of the optical pattern reading process.

17. A three-dimensional shape measuring method according to claim 11, further comprising a reference reading process of reading the target object onto which the optical pattern is not projected, as the image,
- wherein, in the optical pattern analysis process, brightness of the image read through the optical pattern reading process is normalized based on brightness of the image read through the reference reading process, and the optical pattern is analyzed in the image of the normalized brightness.

18. A three-dimensional shape measuring method according to claim 11, wherein,
- in the optical pattern reading process, the optical pattern is read as the image while moving in a sub-scan direction orthogonal to the main scan direction of the optical pattern reading process at a predetermined speed with respect to the target object, and
- in the image analysis process, length information on the main scan direction of the target object is computed based on a number of pixels in the main scan direction in the image, and length information on the sub-scan direction of the target object is also computed based on the predetermined speed.

* * * * *